July 28, 1925.
S. L. HOYT
SEALING-IN WIRE
Filed Nov. 30, 1921
1,547,395
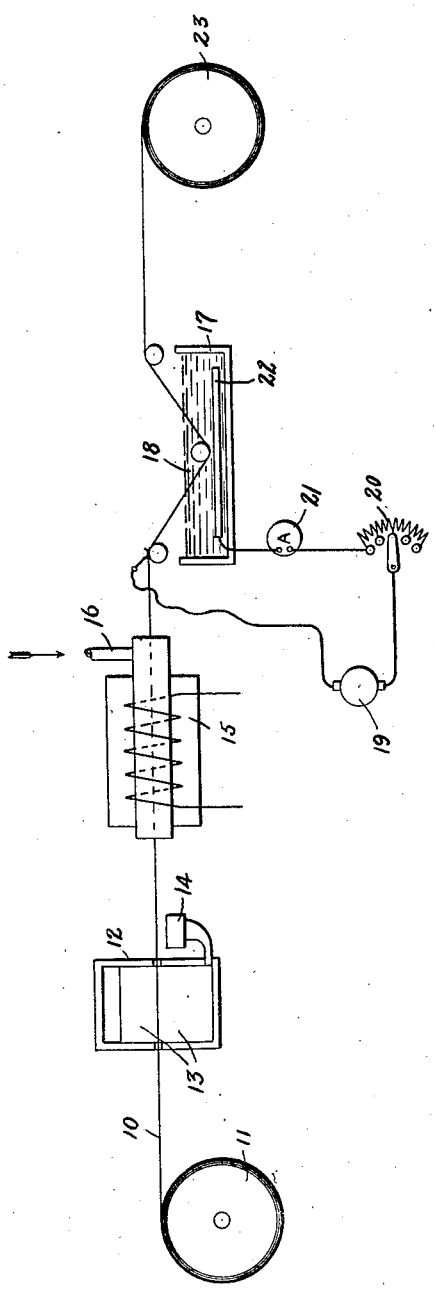
INVENTOR:
SAMUEL L. HOYT,
BY Albert G. Davis
HIS ATTORNEY.

Patented July 28, 1925.

1,547,395

UNITED STATES PATENT OFFICE.

SAMUEL L. HOYT, OF CLEVELAND, OHIO, ASSIGNOR TO GENERAL ELECTRIC COMPANY, A CORPORATION OF NEW YORK.

SEALING-IN WIRE.

Application filed November 30, 1921. Serial No. 518,762.

*To all whom it may concern:*

Be it known that I, SAMUEL L. HOYT, a citizen of the United States, residing at Cleveland, in the county of Cuyahoga, State of Ohio, have invented certain new and useful Improvements in Sealing-In Wires, of which the following is a specification.

My invention relates to wire for sealing into glass and other vitreous materials. It may be used to advantage in the manufacture of so-called wire glass. Another use is for leading-in wires for electric incandescent lamps and other electrical devices comprising a glass or other vitreous container in the walls of which the said leading-in wires are sealed. Inasmuch as such devices are generally either vacuum devices or are filled with a special gas, it is highly essential that the seal be absolutely tight.

My invention consists of a composite wire, which comprises a core and an outer coating, one of high and the other of low expansivity, the two being so intimately united that there is a gradual merging of one into the other. The coating metal is preferably more resistant to oxidation than the core in order to insure a smooth surface in contact with the glass. Inasmuch as the less expensive metals which have low expansivity are alloys the core or coating or both may be of such an alloy. I have found it most desirable to have an alloy core with a single metal coating. A desirable combination is that of an alloy core with a coating of a single metal which is a constituent of the core alloy and preferably that constituent which is most resistant to oxidation.

In the production of my wire I dispense with the use of solder between the coating and the core. This results in a more reliable wire. The use of only two metals is more economical than that of three. I believe I am the first to produce a practical wire of this character in which the coating is united to the core by what may be termed an "alloy bond" or in which the coating metal is more resistant to oxidation than the core metal.

More specifically, my invention consists of a wire comprising a nickel-iron core with a nickel coating thereon and a method of producing the same. In my copending application, Serial No. 489,388, filed August 2, 1921, is disclosed such a wire but with a coating of copper over the nickel. According to the present invention such copper coating is omitted. As in the case of the copper coated wire, the nickel coating is so united to the nickel-iron core that there is no definite plane of division between them but rather a gradual merging of the one into the other. This may be caused by an alloying or forming of a solid solution of the nickel with the nickel-iron core.

Such a wire possesses a number of advantages. One of these is that the surface of the wire is highly resistant to burning or oxidizing. This renders the wire highly desirable for sealing into glass because of the comparatively high heat and sometimes direct contact with flame to which such wire is subject. Another advantage is that the nickel has a high melting point as compared with other metals such as copper, and this allows it to be sealed into vitreous materials having high melting points. In the case where the wire is used as a leading-in wire, it has the advantage that a reliably tight seal may be formed therewith. On account of its resistance to oxidation the inner end may be readily welded, for instance, to a filament. In gas-filled incandescent lamps which are operated at a comparatively high temperature, and in fact in any case where the device into which the said wires are sealed is a high temperature device, the resistance to heat possessed by my wire renders it particularly desirable.

In the drawing I have shown diagrammatically one form of apparatus for electroplating a nickel coating on a nickel-iron core wire. The nickel-iron core wire 10 is carried on a reel 11 and is fed therefrom through a cleaning means 12 comprising pads 13 saturated with a cleaning agent such as carbon-tetrachloride contained in a reservoir 14. The wire 10 then passes through an electric annealing furnace 15 in which it is heated in an atmosphere of hydrogen entering through pipe 16. The wire then passes through a plating tank 17. The plating bath 18 is a solution of a suitable nickel salt such as nickel-ammonium sulphate. Direct current is supplied by the generator 19 and the usual rheostat 20 and ammeter 21 are included in the circuit. The anode 22 is preferably of substantially pure nickel, the cathode being the wire which is continuously fed through the bath to a reel 23.

In one case I started with a core wire of 70 mils diameter composed of nickel-iron alloy containing about 41% nickel. This was preliminarily degasified by heating at 1100° centigrade for a period of between 15 and 30 minutes in an atmosphere of hydrogen. The plating bath was made up according to the following formula: 93 grams $NiSO_4.6H_2O$ (C. P.); 21 grams $(NH_4)2SO_4$ (C. P.); 1000 cc. distilled water; 0.2 cc. conc. $H_2SO_4$ (C. P.). The velocity of the wire through the bath was 7 feet per hour. The plating was continued until the diameter of the composite wire was 74 mils. The wire was then annealed at 750° centigrade and drawn cold to 70 mils diameter in one pass. It was then swaged hot to 50 mils diameter in four passes. The next step was to anneal and draw to finished size which was 10, 12 and 16 mils. This particular lot was used for making leading-in wires for incandescent lamps with good results.

It will be obvious that there are probably other metals which may be substituted for nickel and nickel-iron and it is to be understood, that, where these metals possess the properties hereinbefore referred to, they are to be considered as coming within the scope of my invention as indicated in the appended claims.

What I claim as new and desire to secure by Letters Patent of the United States, is:

1. A composite wire for sealing into glass and other vitreous materials comprising a core of low expansivity and an outer coating of higher expansivity united by an alloy of one with the other.

2. A composite wire for sealing into glass and other vitreous materials comprising a nickel-iron core and an outer coating of nickel united thereto so that a cross-section shows no clear line of demarkation.

3. A composite wire for sealing into glass and other vitreous materials comprising a core and an outer coating to contact with the glass or other material differing in expansivity and united by an alloy of one with the other.

4. A composite wire for sealing into glass and other vitreous materials comprising a core and an outer coating of greater resistance to oxidation than said core and united directly to said core without any intervening bonding metal and so that a cross-section shows no clear line of demarkation.

5. A composite wire for sealing into glass and other vitreous materials comprising a nickel-iron core and an outer coating high in nickel united directly to said core without any intervening bonding material and so that a cross-section shows no clear line of demarkation.

6. A composite wire for sealing into electric incandescent lamps and similar devices to produce a gas-tight seal and comprising a core and an outer coating of greater resistance to oxidation than said core and united directly to said core without any intervening bonding metal and so that a cross-section shows no clear line of demarkation.

7. A composite wire for sealing into electric incandescent lamps and similar devices to produce a gas-tight seal and comprising a nickel-iron core and an outer coating high in nickel united directly to said core without any intervening bonding metal and so that a cross-section shows no clear line of demarkation.

8. The method of making a sealing-in wire which consists in coating a metal core with a metal more resistant to oxidation and then mechanically working and heat treating the composite blank to produce a wire having a gas-tight direct union between the core for coating metals and having no clear line of demarkation between the said core and coating metal.

9. The method of making a sealing-in wire which consists in coating a nickel-iron core with a metal high in nickel and then mechanically working and heat treating the composite blank to produce a wire having a gas-tight direct union between the core and coating and having no clear line of demarkation between the said core and coating metal.

10. The method of making a sealing-in wire which consists in electroplating a metal core with a metal more resistant to oxidation and then mechanically working and heat treating the composite blank to produce a wire having a gas-tight direct union between the core and electroplated metals and having no clear line of demarkation between the said core and coating metal.

11. The method of making a sealing-in wire which consists in electroplating a nickel-iron core with a metal high in nickel and then mechanically working and heat treating the composite blank to produce a wire having a gas-tight direct union between the core and electroplated metals and having no clear line of demarkation between the said core and coating metal.

In witness whereof, I have hereunto set my hand this 28 day of November 1921.

SAMUEL L. HOYT.